INVENTOR
JOSEPH E. WHITFIELD

BY

ATTORNEY

Nov. 11, 1969   J. E. WHITFIELD   3,477,595
CARRIAGE MECHANISM FOR A LOAD HANDLING DEVICE
Filed March 3, 1967   6 Sheets-Sheet 5

INVENTOR
JOSEPH E. WHITFIELD

BY

ATTORNEY

United States Patent Office 3,477,595
Patented Nov. 11, 1969

3,477,595
CARRIAGE MECHANISM FOR A LOAD HANDLING DEVICE
Joseph E. Whitfield, York, Pa., assignor, by mesne assignments, to The Greater Iowa Corporation, Des Moines, Iowa, a corporation of Iowa
Filed Mar. 3, 1967, Ser. No. 620,441
Int. Cl. B60p 1/46; B66c 23/06
U.S. Cl. 214—75                   19 Claims

ABSTRACT OF THE DISCLOSURE

A mobile vehicle having a lateral boom extending from a mast extending upward from a carriage which is supported by roller means for movement along track means which extend longitudinally below the bed of the vehicle, the roller means all being driven for unidirectional engagement with either upper or lower portions on the track means to provide positive driving engagement therewith regardless of incidental canting of the carriage relative to the bed of the vehicle and said mast being rotatable through a full circle while supporting said boom from the upper portion thereof.

BACKGROUND OF THE INVENTION

The invention pertains primarily to mobile vehicles such as automotive trucks and trailers of the type which haul heavy loads requiring power hoist mechanism to load and/or unload the vehicle. The power hoists comprise a mast and boom carried by the vehicle, usually upon the bed thereof. For about the past ten years or more, it has been the practice to mount the mast fixedly to the bed, substantially centrally thereof, especially when the vehicle and hoist are of the type designed primarily to haul cubes of concrete blocks and bricks of various sizes, some of such cubes weighing two or three tons or more.

Especially for purposes of loading or unloading vehicles having relatively long beds, it is obvious that correspondingly long booms are required to reach all areas of the bed if the mast is at a fixed location thereon, some boom arrangements necessitating the use of outrigger braces. To obviate the need for such long booms while still permitting the use of long truck and trailer beds, some manufacturers have resorted to the use of various types of auxiliary bases, supports, or carriages mounted upon the vehicle bed for longitudinal movement therealong. Bracing the mast against tilting upon such movable supports has presented numerous problems which have been solved in a limited number of ways, most of which leave much to be desired.

One such solution comprises extending the auxiliary movable support for the mast across the entire bed of the vehicle and support it on tracks along opposite side edges of the bed, such as shown in Patent No. 2,857,062, issued Oct. 21, 1958. Arranging the track in such manner sacrifices some of the area which can be occupied by the pay load. To move the tracks inwardly from the side edges normally interferes even more with the pay load area or renders it totally unfeasible to have any substantial area for the pay load as evidenced by Patent No. 3,095,099, issued June 25, 1963 and Patent No. Re. 23,546, of original Patent No. 2,437,086, issued Mar. 16, 1948.

Another difficulty encountered in moving a mast and boom supporting carriage along a vehicle bed is in regard to driving the carriage along the bed. If channels are used as track means to receive rollers disposed therein for movement about horizontal axes, when the load is shifted in loading or unloading, such as by swinging the boom from one side to an end or to the opposite side of the bed, canting of the carriage occurs. Such canting shifts the engagement of the rollers within the channels from the lower to the upper flanges of the channels, for examples, or vice versa. When this occurs, a forward roller may be in driving engagement tending to move the carriage in one direction while the rearward roller is tending to drive it oppositely, or vice versa. This is also the situation relative to rollers on opposite sides of the carriage when the cant is shifted from one side to the other and the rollers are all driven unidirectionally.

Previous attempts to solve the foregoing dilemma have resulted in applying driving force only to rollers at one side or one end of such carriage, thus resulting in much less driving engagement with the track means. Further, if canting shifts under such circumstances, the driving forces of the driven rollers can be suddenly reversed due to shifting engagement from upper to lower flanges, or example, or vice versa, requiring sudden reversal of the motor to continue movement in a desired direction. These situations are but a few examples of existing difficulties due to the lack of positive unidirectional drive of all or substantially all driving rollers for continuous movement of a carriage in a single desired direction along track means, regardless of shifting in the canting of such carriage for example.

Other prior patents of interest are No. 1,048,320, Koelle (1912); No. 3,092,268, Powers (1963); and No. 3,194,178, Weston (1965).

SUMMARY OF THE INVENTION

The invention provides a mast supported upon a carriage mounted for longitudinal movement along the bed of a mobile vehicle in such manner that the full width of the bed may be used for pay load occupancy and all but about several feet or less of the length of the bed is similarly available for pay load. This is made possible by providing a vehicle bed having a pair of transversely spaced narrow slots extending longitudinally from the rear end of the bed a substantial predetermined distance toward the front end and both slots being spaced inwardly from the side edges of said bed to permit loading thereof for the full width. A carriage of minimum length in the direction of the longitudinal axis of the bed so as to conserve pay load space, is movable longitudinally along said bed and is both supported and propelled by roller means engageable with track means below the bed of the vehicle.

Said rollers are supported at locations horizontally spaced in several directions on said carriage, the supporting means extending at least partially into or through said slots. The supporting track means are at least no higher than the load-receiving surface of the bed and are parallel to and adjacent said slots. Said tracks also have relatively upper and lower surface portions engaged by complementary portions on said roller means which are all positively driven in directions to provide unidirectional movement of the carriage at any given time by such driving engagement of the roller means with one or the other of said surface portions of the truck means, regardless of the direction in which the carriage may be canted, or not canted relative to the bed of the vehicle.

A number of different operable embodiments of roller and track means are provided which incorporate the same basic principles of the invention but respectively offer advantages suitable to different design situations and load requirements, whereby the same are not equivalents of each other.

Drive means of reversible type are connected to said roller means to rotate the same, or a suitable reversible clutch or transmission may be used, so as to effect movement of said carriage along said track means to move said mast and boom thereon longitudinally in a desired direction along said bed. The mast is also mounted for rotation about its axis relative to said carriage by means entirely above the bed of the vehicle. Power means and drive mechanism to effect such rotation are carried by said carriage preferably above said bed, whereby only the roller means and portions of their supporting means and the track means engaged thereby are positioned below the load-receiving surface of the bed of the truck.

The mast is preferably tubular and is supported for rotation upon a central support on said carriage which preferably is short and supports one race of a relatively large diameter, heavy-duty anti-friction bearing unit having a pair of concentric races with rolling members interposed therebetween. The lower end of the mast is connected to the other race, one periphery of which also comprises a ring gear engaged by a driving pinion of power mechanism preferably carried by said carriage for controlled rotation of said mast relative thereto. The mast encloses a fluid cylinder unit operable to raise and lower the boom about its pivot which is supported by the upper end of the mast.

DESCRIPTION OF THE PREFERRED EMBODIMENTS

Figure 1:
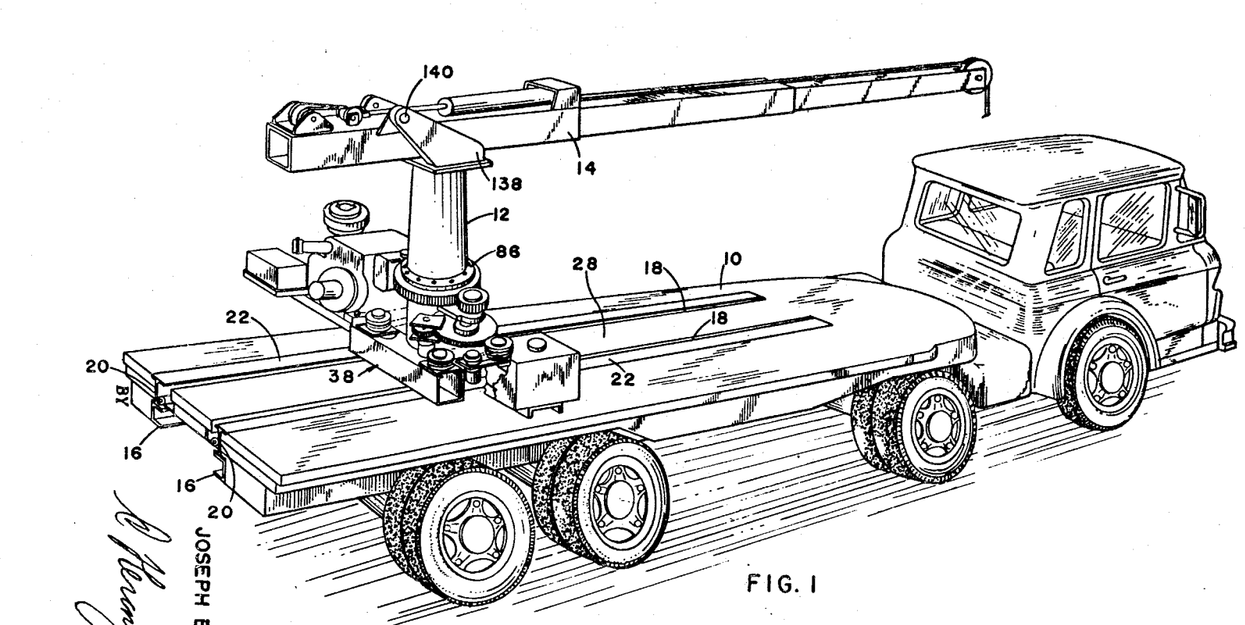
FIG. 1 is a perspective view of an exemplary automotive vehicle having a bed formed in accordance with the invention and supporting a movable mast and boom means also embodying the invention.

Referring to FIG. 1, an exemplary mobile vehicle to which the present invention pertains is illustrated. As shown, such vehicle comprises a tractor-trailer unit of the automotive type. Such illustration is intended to be illustrative rather than restrictive however, and the principal purpose of such illustration is to exemplify a vehicle bed 10 constructed to embody certain portions of the invention, in association with one embodiment of mast 12 which, at its upper end, supports an exemplary boom 14. Vehicles of the type to which the present invention pertains normally are provided with chassis stringer members 16 which, as shown, frequently comprise structural steel channels, the longitudinal openings of which face each other. Such chassis members 16 are suitably connected to the running gear of the vehicle by conventional means, not illustrated.

In the sale of loading and unloading hoists for mobile vehicles of the general type to which the present invention pertains, it is relatively common practice for the manufacturer of the hoist mechanism also to manufacture the bed 10. In regard to the present invention in particular, this is advantageous inasmuch as such bed should be constructed somewhat differently from conventional beds for mobile vehicles, particularly to the extent of providing a pair of parallel slots 18 which extend longitudinally of the bed 10, said slots preferably being spaced equal distances inward from the opposite side edges of the bed 10. In the exemplary illustration in FIG. 1, the slots 18 are shown as extending inward from the rear end of the bed 10, toward the front end thereof and terminate a certain distance from said front end. If desired however, it is to be understood that these slots may extend substantially to the forward end of the bed 10.

Figure 2:
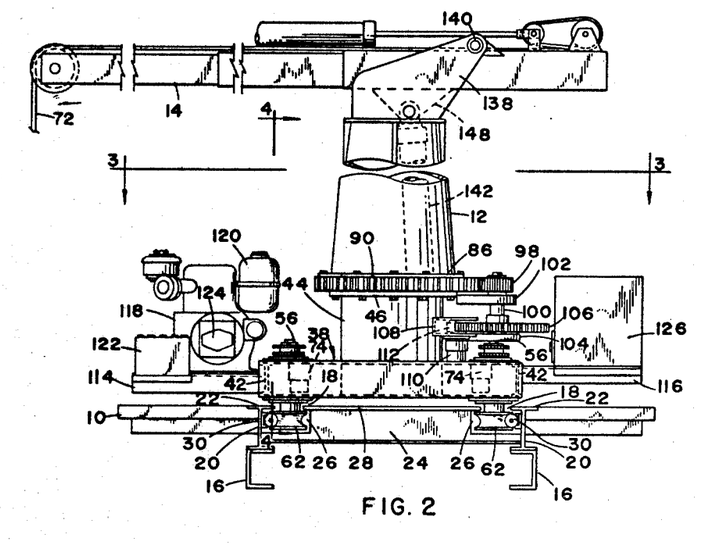
FIG. 2 is an exemplary rear elevation of the vehicle bed and mast structure illustrated in FIG. 1, part of the mast and boom thereon being broken away to foreshorten the view.

The purpose of the slots 10 is well illustrated in FIG. 2, in which it will be seen that the bed 10 also comprises a pair of elongated structural members 20 which are specifically illustrated as comprising I-beams. However, such illustration is to be regarded as exemplary rather than restrictive. The upper flanges 22 of the structural members 20 preferably are flush with the upper, load-bearing surface of the bed 10.

Extending between the inner surfaces of the webs of the members 20 are a plurality of cross-members 24, the opposite ends of which are cut out to form recesses 26 for purposes to be described. The upper edges of the beams 24 support deck plate means 28, the side edges of which preferably define one edge of the slots 18. The opposite edges of said slots are defined by one edge of the upper flanges 22 of the structural members 20. It also will be understood that a suitable number of cross-members 24 will be provided, as dictated by the strength required by the deck plate means 28 to support loads thereon. In the preferred construction of the invention, the slots 18 are preferably of the order of only a few inches in width, for example, 3 to 5 inches.

The lower surfaces of the structural members 20 preferably rest directly upon the upper surfaces of the chassis stringer members 16 as shown in exemplary manner in FIG. 2. They may be connected to said stringer members by any appropriate means such as conventional bails, bolts, or the like, not shown. Such arrangement provides firm support for the members 20 and such support is transmitted to the interconnected parts of the bed 10. Another major function of the structural members 20 is to support exemplary track means which are parallel to each other and extend longitudinally of the bed 10, such track means also comprising a major feature of the invention.

Figures 3, 12:
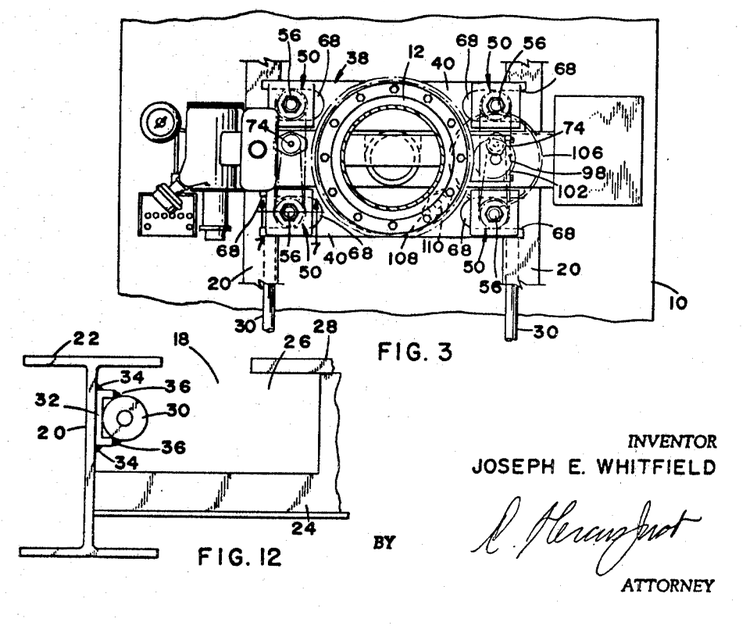
FIG. 3 is a fragmentary plan view illustrating primarily the carriage which moves along the bed and supports the mast, as shown on the line 3—3 of FIG. 2.
FIG. 12 is a fragmentary end view of a detail of the structure shown in FIG. 2.

Referring to FIGS. 2 and 12, it will be seen that in said embodiment of the invention, said track means preferably comprise elongated heavy-walled cylindrical tubes 30. Said tubes are supported by the inner surfaces of the vertical webs of the structural members 20. To facilitate the connection of such tubular tracks 30 to the members 20, an elongated shallow channel member 32 of suitable size and weight is placed against said inner surface of the vertical webs of the members 20, intermediately of the upper and lower edges thereof, and firm connection is effected by either continuous or a series of interrupted weldments 34. The flanges of the channel members 32 closely accommodate the tubular track members 30 therein and firm, fixed connection of the track members 30 to said channels is accomplished by additional continuous or a series of interrupted weldments 36. From FIG. 12 in particular it will be seen that such arrangement affords ample supporting strength for the elongated track members 30 which, in cross-section, provide a convex surface having upper and lower surface portions for purposes to be described.

For economy of weight coupled with suitable rigidity, the track means 30 preferably comprise tubes having very thick walls, much thicker than conventional pipe for example, and preferably at least partially hardened to increase the wear resistance thereof. The primary purpose of the track means 30 is to support a carriage 38 which is parallel to the plane of the vehicle bed 10, extends transversely across the upper surface of the same between the slots 18, and preferably moves within a plane relatively close to the load-bearing surface of bed 10. The lower end portion of the mast is interconnected to the carriage 38 by means to be described in detail hereinafter.

Figures 4, 6, 7:
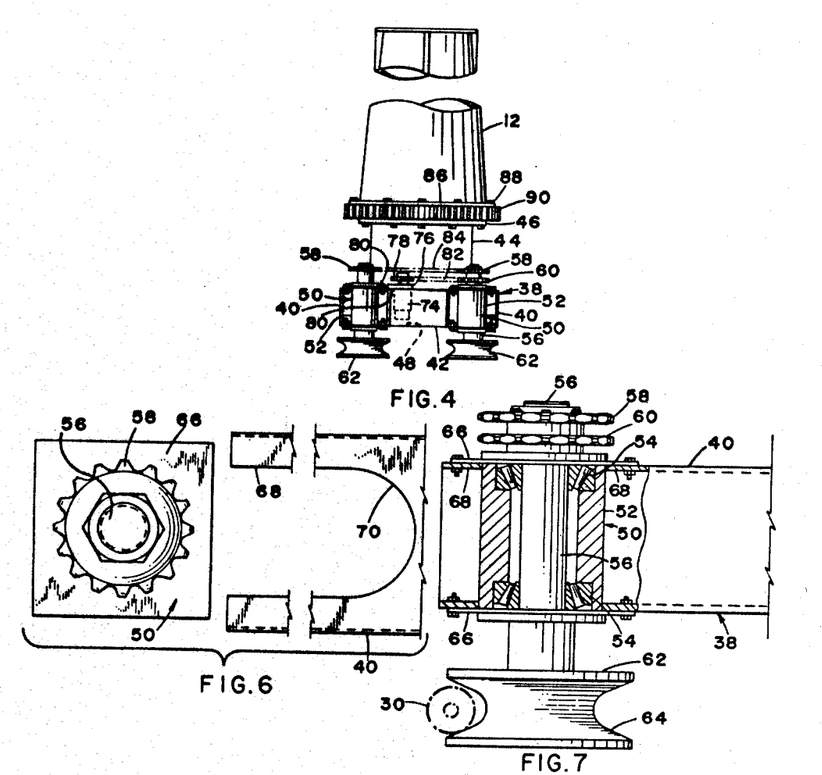
FIG. 4 is a vertical sectional elevation of the carriage and mast illustrating FIG. 2 as seen on the line 4—4 thereof, the mast also being foreshortened to accommodate the same to the sheet.
FIG. 6 is an exploded and partially foreshortened view illustrating in greater detail then in FIG. 5 the adjustable positioning of said shaft and bearing units with respect to the means on the carriage which receive the same.
FIG. 7 is an enlarged fragmentary vertical sectional view as seen on the line 7—7 of FIG. 3.
Figure 5:
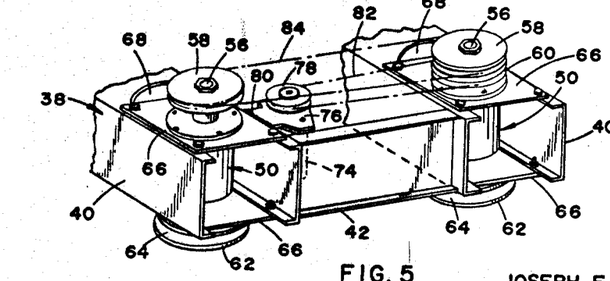
FIG. 5 is a fragmentary perspective view showing the lower portion of the structure illustrated in FIG. 4 and showing the adjustable mounting of the shaft and bearing units with respect to the carriage.

Carriage 38 may be of a number of different constructions. The one illustrated primarily comprises a pair of parallel frame members 40 which are the principal structural elements of said carriage. As best seen in FIGS. 4 and 5, the frame members 40 are tubular and in cross-section are rectangular. Adjacent the opposite ends thereof, said frame members are connected and braced by a pair of transverse structural members 42, such as narrow flanged I-beams, the opposite ends of which are welded to facing side walls of the members 40. The rigidity of the carriage 38 also is enhanced by rigidly connecting thereto the lower end of central support means 44 comprising a short section of a relatively thick-walled tube, the upper end of which has a circular radial flange 46 affixed thereto such as by welding.

The diameter of the means 44 preferably is greater than the transverse distance between the inner walls of the frame members 40, whereby the lower portions of the opposite side walls of the means 40 are cut away to provide a pair of downwardly extending heavy tongues 48 which are shown in FIG. 4. In transverse cross-section, said tongues are arcuate, comprising part of the cylindrical walls of the means 44. The tongues 48 closely fit between the inner, opposed side walls of the members 40 and are welded thereto. Also, the cut-away portions of the side walls of means 44 which abut the upper surfaces of members 40 closely conform to said upper surfaces and likewise are welded thereto, all of which produces a very rigid structure resisting distortion imposed by torsional stresses.

The carriage 38 is both supported and propelled by relatively simple means which comprise one of the primary features of the present invention. Referring to FIG. 7, details of one embodiment of said feature are illustrated which comprise a plurality of horizontally spaced vertical shafts and bearing assemblies 50. One of said units is located approximately in each of the four corners of the carriage 38. Each unit comprises a bearing support sleeve 52 having seats in the opposite ends thereof for combination radial and thrust anti-friction bearing units 54. A shaft 56 extends through said bearings for support thereby. The upper ends of two of said shafts have driving means connected thereto comprising a pair of vertically spaced sprocket gears 58 and 60, see FIGS. 4–7, and the other two shafts only have a single sprocket gear 58 thereon. The lower ends of each shaft have a circular, laterally extending member thereon preferably comprising a grooved roller 62. Rollers 62 are fixed to the shafts 56 by any suitable means, such as keys, to prevent relative rotation therebetween.

The grooves in said rollers are relatively complementary to the convex surface of the tubular track means 30 although, preferably, the groove 64 in each roller has an innermost curvature on a slightly smaller radius than that of the tubular track members 30, somewhat as shown in exemplary manner in FIG. 7. Such arrangements provide substantially a pair of relatively upper and lower line contacts between the surfaces of grooves 64 and the convex surfaces of the tubular track members 30. By such an arrangement, a more precise working relationship can be effected between the supporting and traction rollers 62 and the track members 30 which support them.

It will be understood that one or the other of said line contacts will be established, for example, between the uppermost or lowermost side walls of the grooves 64 in the rollers 62 and the corresponding engaged surfaces on the tubular track members 30, depending upon whether the boom 14 is extending laterally from one side or the other of the bed 10, extending over the rear end thereof, or extending forwardly of the bed 10 with respect to the axis of the mast 12. Under ideal conditions, limited clearance is preferred between the grooves of the rollers 62 and the tubular track members 30 to permit ready self-seating of the rollers 62 relative to the track members therefor. More importantly, however, it will be seen that both rollers on each side of the carriage are driven unidirectionally, though the rollers on one side rotate in an opposite direction to those on the other side, to produce a single driving direction for the carriage at any one time, regardless of whether the upper or lower flanges of the rollers are engaging the track members.

The shaft and bearing units 50 also include upper and lower rectangular flange plates 66 which may be rigidly connected, for example, to the opposite ends of the bearing support sleeve 52 of each assembly. Also, the upper and lower walls of each of the parallel frame members 40 have relatively wide slots 68 extending inward from outer ends thereof, terminating in arcuate walls 70 complementary to the cylindrical outer surface of the bearing support sleeves 52. The flange plates 66 of each assembly 50 closely engage the outer surfaces of said upper and lower walls of the frame members 40, as can be seen from FIGS. 5 and 7, thereby functioning as guide means during movement of each of the assemblies 50 into the respective slots 68 in the end of one of the frame members 40 which is to receive the same. The slots 68 are of sufficient length to permit a limited but reasonable amount of longitudinal adjustable movement of the assemblies 50 with respect to their corresponding ends of the members 40 for the following purposes.

As will best be seen from FIG. 3, a plurality of shaft and bearing units 50 respectively is positioned along opposite sides of the carriage 38, and preferably adjacent opposite ends of said sides. There preferably is one such unit 50 in each corner of the carriage 38 for purposes of affording satisfactory support of the carriage solely by the engagement of the rollers 62 with the track members 30. Both the transverse and longitudinal spacings of the centers of the shafts 56 with respect to each other is sufficient to prevent any appreciable tilting or canting of the axis of the mast 12, which is supported by the carriage 38, relative to the bed 10.

Inasmuch as the boom 14, which is provided with a load-supporting cable 72, under all conditions of use will exert upon the mast 12 a tendency to tilt the same away from its normal vertical axis with respect to the bed 10, it will be seen that either the upper or the lower flanges of the grooved roller 62 will be brought into firm frictional engagement with the aforementioned upper or lower surface portions of the track members 30. Such engagement serves to provide firm support for the carriage 38 by said track members, and also effects driving friction between the rollers and the track members, regardless of which way the carriage is canted by the load on the boom and mast. Of greatest importance is the fact that such driving engagement is unidirectional by all of the rollers when the carriage is moving in a desired direction.

The drive means for each of the vertical supporting shafts 56 of the units 50, in addition to the sprocket gears 58 and 60, also comprises a prime mover 74 which is preferably a hydraulic motor of appropriate power rating. Further in regard to the preferred arrangement of the invention, two such motors 74 are provided, the same respectively being carried by opposite sides of the carriage 38. Such motors are supported by appropriate bracket plates 76, see FIGS. 4 and 5, the shafts of each being provided with a driving sprocket gear 78. The bracket plates 76 may be rendered rigid with respect to the carriage such as by suitable weldments 80 such as shown in FIGS. 4 and 5.

The sprocket gears 78 of each motor 74 are connected by an appropriate sprocket chain 82 to lower sprocket gears 60 of one of the units 50 at one side of the carriage 38 as shown in FIGS. 4 and 5. The upper sprocket gears 58 of both of the units 50 on each side of the carriage 38 are connected by another sprocket chain 84. Hence, individual motors 74 respectively drive both of the shafts 56 and grooved rollers 62 at each side of the carriage 38 unidirectionally. The motors 74 also are of the reversible type. Similarly, during any given longitudinal movement of the carriage 38 with respect to the bed 10, the motor 74 adjacent one side of the carriage will be rotating in the opposite direction from the motor on the opposite side of the carriage, whereby either forward or rearward movement of the carriage, mast and boom with respect to the bed 10 is produced, depending upon which direction of movement is desired and the control means for the motive power to the motors 75 is appropriately regulated.

It also is to be understood that while the drive means for the shafts 56 and grooved rollers 62 is illustrated as comprising sprocket gears and sprocket chains, other appropriate, preferably flexible driving means of a positive traction nature may be utilized. Sprocket gears and chains have been preferably selected for such purpose because of the inability for any slippage to occur between driving and driven members in such a system.

It also is to be realized that a manufacturer of hoisting equipment of the type embodying the present invention is required to furnish beds 10 capable of being fitted to a chassis having varying distances between the chassis stringer members 16 for example. Fortunately, the transverse distances between such members on most of the different standard makes of trucks and trailers does not vary excessively. However, in order to provide desired firm support of the bed 10 with respect to any given chassis, an order for a hoist embodying the present invention preferably includes the transverse dimension of the chassis stringers 16 in order that a bed 10 may be fabricated on a custom basis by the manufacturer so as to dispose the elongated structural members 20 of the bed in direct vertical alignment with the upper flanges of the stringer members 16 for example. Such arrangement also will cause a variation in the transverse distance between the longitudinally extending slots 18 in the bed 10 between one make or type of chassis and another. This variation in transverse spacings of the slots 18 requires appropriate corresponding variation in transverse spacing between the central axes of the right and left hand pairs of vertical shafts 56 of the assemblies 50 so that the grooved rollers 62 may suitably engage the track members 30 which are directly supported by the structural members 20 which are integral with the bed 10.

One form of appropriate adjustment in the transverse spacing between the right and left hand shafts 56 is accomplished through the provision of the slots 68 described above by which the assemblies 50 are afforded a limited amount of transverse adjustable positioning within said slots. Accordingly, when the transverse spacing between the longitudinal slots 18 in the bed of the truck has been decided in accordance with a given order for a bed and hoist therefor, the units 50 respectively in the four corners of the carriage 38 are suitably adjustably spaced transversely within their corresponding, similar slots 68 in both the upper and lower walls of the frame members 40 and when the desired positions of each assembly in said slots 68 have been determined, both the upper and lower flange plates 66 of said unit are secured appropriately to said upper and lower walls of the frame members 40, such as by a suitable number of bolts, rivets or a series of weldments which permanently affix the unit 50 in desired location upon the carriage 38.

Figure 11:
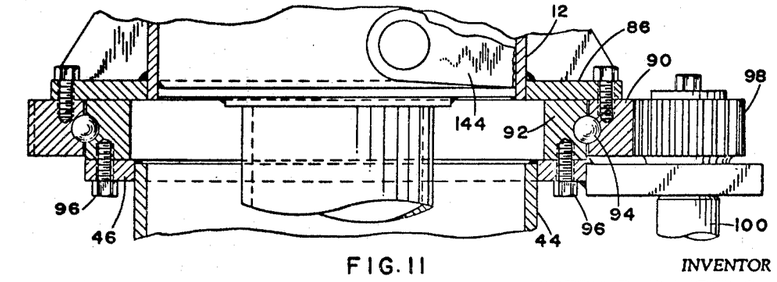
FIG. 11 is a fragmentary vertical sectional view as seen on the line 11—11 of FIG. 10 and illustrated on a larger scale particularly to show the connection of the races of the antifriction supporting bearing for the mast to the structure connected therewith.

The embodiment of mast 12 illustrated in FIGS. 1–4, preferably is tapered upwardly and somewhat gradually inwardly. The lower end of the mast 12 has an annular flange 86 fixed thereto, such as by a continuous weld around the inner periphery of the flange. Said flange also is provided with a plurality of circumferentially spaced holes to receive securing bolts 88 which are threaded into the upper face of a ring gear 90. Referring to FIG. 11, it will be seen that said ring gear 90 also comprises the outer race of a heavy duty antifriction bearing assembly of substantial diameter and otherwise comprising a concentric inner race 92. The adjacent faces of said inner and outer races are grooved in complementary manner to receive therebetween a conventional series of rolling anti-friction members 94. Though illustrated as comprising ball bearings, the members 94 also may comprise other forms of rolling members as long as the same are of such design as to constitute a reversible type thrust bearing. The flange 46 at the upper end of central support means 44, as shown in FIG. 11, also is fixedly connected to the inner race 92 by appropriate bolts 96.

From the foregoing, it will be seen that the mast 12 and all of the boom structure connected thereto at its upper end is supported by the carriage 38 solely through the means of the large, heavy duty anti-friction bearing assembly. The capability of such bearing assembly sustaining reverse directions in thrust is fully adequate to sustain all contemplated loads to be imposed upon the boom 14 and the anti-friction nature of such bearing assembly requires relatively economical power to rotate the mast 12 and the boom extending therefrom about the vertical axis of the mast. Rotation of such mast and boom is effected by simple drive means such as a pinion gear 98 fixed to a short shaft 100 mounted adjacent its opposite ends within a pair of vertically spaced bracket bearing plates 102 and 104 as shown in FIG. 2.

The shaft 100 also supports a large diameter driven gear 106. A radial bracket 108 is connected at one end to the central support means 44 adjacent the periphery of gear 106 and supports another preferably reversible prime mover 110 which, for example, may comprise a hydraulic motor or a motor which may be powered by any other suitable type of energy, preferably of a source originating upon the vehicle. A driving pinion gear 112 fixed to the shaft of motor 110 meshes with gear 106 to drive pinion 98 and, in turn, rotate ring gear 90 about its axis to revolve the mast 12 and the boom 14 carried thereby, selectively in reverse rotary directions.

Referring particularly to FIGS. 1–3, it will be seen that the carriage 38 also supports at least one preferred type of energy-supplying means for the several motors 74 which effect longitudinal movement of the carriage, mast and boom with respect to the bed 10, and motor 110 which effects rotation of the mast and boom about the axis of the mast. In the exemplary illustration of said figures, appropriate laterally extending supporting frames 114 and 116 are connected to opposite sides of the carriage 38, by any suitable means such as by welding such supporting frames respectively to the frame members of the carriage. Frame 114, for example, supports an exemplary gasoline engine 118, having a fuel tank 120 associated therewith and a starting battery 122 also suitably supported adjacent the engine. A hydraulic pump 124 of suitable commercial type is directly connected to the casing of engine 118 for support thereby and for operation by the crank shaft of the engine.

On the opposite side of carriage 38, the supporting frame 116 preferably has an oil reservoir 126 disposed thereon and is of sufficient capacity to supply operating fluid to all of the hydraulic motors 74 and 110 when operating under all possible conditions of use. The capacity of the reservoir 126 also is such that it affords a reasonable amount of counter-balancing for the energy-generating elements carried by the opposite supporting frame 114.

Although hydraulic motors and appropriate hydraulic pressure generating means are described in detail above for purposes of both moving the carriage and the members supported thereby longitudinally of the bed as well as for rotating the mast and its boom about the vertical axis of the mast, it is to be understood that other types of driving and motivating means may be used, such as electric motors which, though not shown, may be of conventional type supplied with current by motor-generating units carried at an appropriate location by the vehicle and current therefrom may be furnished to the electric motors employed upon the structure by flexible lines.

Figure 8:
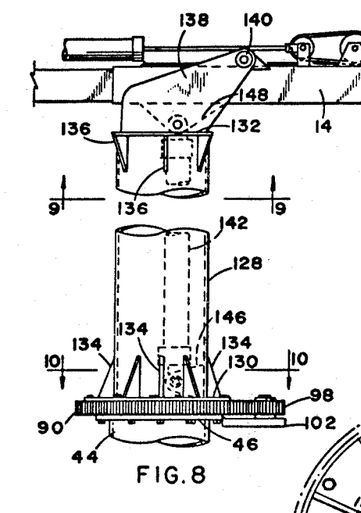
FIG. 8 is a fragmentary vertical elevation showing one embodiment of mast structure and the bearing means which support the same.
Figure 9:
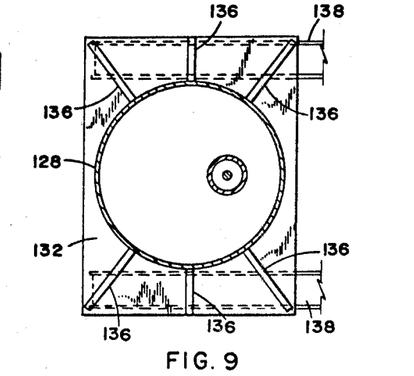
FIG. 9 is an enlarged transverse sectional view of the embodiment of mast shown in FIG. 8 as seen on the line 9—9 of said figure.
Figure 10:
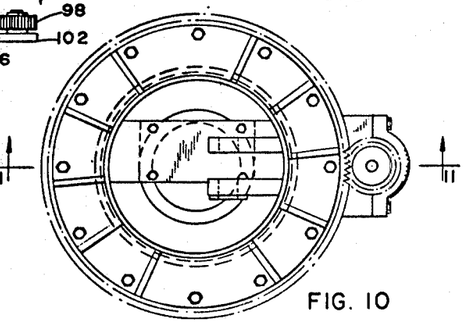
FIG. 10 is an enlarged transverse sectional view of the mast embodiment illustrated in FIG. 8 as seen on the line 10—10 of said figure.

The present invention also contemplates another type of mast slightly different from that shown in FIGS. 1–4, said additional embodiment particulary being shown in detail in FIGS. 8–10. The mast 128 in such embodiment is tubular and of substantially uniform diameter. The lower end thereof is fixed, such as by weldments, to a circular bottom plate 130 and the upper end has a substantially rectangular head plate 132 connected thereto such as by weldments. For suitably bracing the bottom plate 130 with respect to the mast 128, a series of radially extending, triangular brace plates 134 are disposed in appropriate circumferentially spaced relationship around the lower end of mast 128 and are welded to the exterior surface of the mast and also to the upper surface of bottom plate 130. The head plate 132 also is braced by a suitable number of triangular bracing plates 136, the same being welded to the outer surface of the upper portion of mast 128 and to the lower surface of head plate 132. The circumferential arrangement thereof is illustrated in exemplary manner in FIG. 9.

The principal reason for bracing the head plate 132 is to provide firm support for the pair of transversely spaced pivot plates 138, which if desired may be of a composite nature and are spaced transversely to receive the rearmost section of boom 14 therebetween. Pivot bearings 140 are mounted in the upper, outermost ends of the pivot plates 138 and are suitably connected pivotally to the rearmost section of boom 14. Pivotal movement of the boom 14 with respect to the embodiment of mast 12 shown in FIGS. 1–4 or the embodiment of mast 128 shown in FIGS. 8–10 effectively is accomplished by a hydraulic cylinder unit 142 disposed substantially vertically on the interior of either embodiment of such mast.

The outer end of a piston rod projects from one end of said hydraulic unit and a suitable clevis is fixed to the opposite end thereof. Within the interior of the mast 12, as shown in FIG. 11, an appropriate laterally extending ear 144 is connected at its outer end, pivotally, to one end of said hydraulic unit 142, and the cylindrical mast 128 of FIGS. 8–10 is provided on its interior with a similar ear 146 which likewise is pivotally connected at its outer end to one end of the hydraulic cylinder unit 142. The opposite end of such units in both instances is connected appropriately to sturdy ears or flanges 148 connected to the lower surface of the rearmost section of boom 14 as shown respectively in FIGS. 2 and 8.

From the foregoing, it will be seen that the entire supporting and traversing mechanism for the carriage and all of the mast and boom structure supported thereby, as well as all of the mechanism for rotating the mast and its boom about the vertical axis of the mast is disposed entirely above the load-bearing surface of the bed 10 with the exception of the relatively short downwardly projecting ends of the transversely and longitudinally spaced vertical shafts 56 which extend into the slots 18 extending longitudinally of the bed 10 and the grooved rollers 62 fixed to said lower ends but which have relatively short vertical dimensions.

Such arrangement not only provides substantially complete freedom from any interference with the mechanism carried by the chassis of the vehicle to which the bed 10 is connected for longitudinal support and movement of the carriage 38, and either embodiment of rotatable, vertical mast and transversely extending boom which is supported by said carriage. Said freedom from obstruction enables the use of relatively simple transverse crossbeams 24 for supporting deck plate means 28 between the slots 18. Although the track members 30 are adjacent the slots 18, they are reasonably well shielded by the upper flanges 22 of the elongated structural members 20 comprising an integral part of the bed 10. Hence, there is but little possibility for any dirt or debris falling through the relatively narrow slots 18 from the load-bearing surface of the bed 10 to cause any damage of any kind to the track members and supporting and driving rollers 62.

Notwithstanding the foregoing structure however, amply braced support for the carriage, mast and boom is provided so as to prevent any appreciable tilting of the mast under all conditions of use. In addition, ample frictional driving engagement between the supporting and propelling rollers 62 and the complementary track members 30 likewise is provided to enable the carriage to be moved in either desired direction, longitudinally of the bed 10. The principal feature enabling the foregoing to be accomplished is the relatively simple arrangement of the vertical shafts 56 at both transversely and longitudinally spaced locations upon the carriage 38 and the co-engagement between the upper and lower flange surfaces on the rollers 62 and complementary surfaces on the track members 30 which prevent any appreciable relative vertical movement between said track means and the carriage 38 while insuring positive driving of all rollers in a common direction of movement of the carriage, regardless of any canting of the carriage relative to the track members in directions transversely or longitudinally of the bed of the vehicle.

The aforementioned positive driving effect of all rollers relative to their track means as described hereinabove with respect to the embodiment shown in FIGS. 1–12 may be accomplished by additional forms and types of track means and supporting and driving rollers to engage the same. Several further embodiments of the same are illustrated respectively in FIGS. 13–16 and FIGS. 18–20. The first of these additional embodiments will now be described, as follows.

Figure 13:
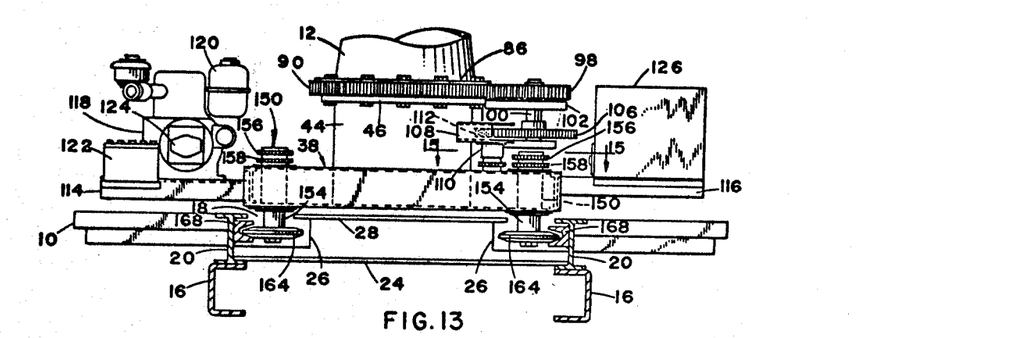
FIG. 13 is an exemplary rear elevation of vehicle bed and mast structure of the type generally illustrated in FIG. 1 but showing a different embodiment of track and supporting roller structure from that shown in the preceding figures and the upper portion of the mast being removed to decrease the height of the figure.

In FIG. 13, an end view of such additional alternative embodiment of driving and supporting means for the carriage 38 is illustrated. It will be understood in this regard that the basic structure of the carriage per se may be the same as that illustrated in the preceding embodiment or any other type of suitable basic carriage structure may be employed, preferably as long as the same is relatively rigid and especially if it is capable of resisting any appreciable skewing incident to the vehicle bed traversing irregular terrain. Accordingly, the structure shown in FIG. 13 as being supported by the carriage 38, for simplicity of description, is similar to that illustrated in the preceding embodiments and especially as illustrated and denoted by reference characters in FIGS. 2 and 3. Repetition of such detailed description therefor is not believed necessary, it being understood that the same basic principles of the boom, its supporting means, the mast, and driving means for rotating the same, and the exemplary power supply means for the driving rollers and the boom and mast actuating means is the same or the equivalent of that in the embodiment specifically shown in said FIGS. 2 and 3.

As in regard to said embodiment of FIGS. 2 and 3, there is provided adjacent each corner of the carriage 38, a shaft and bearing unit 150 which preferably are adjustably positionable with respect to the carriage frame, particularly in a transverse direction, for the purposes described above in regard to said preceding embodiment. Similar securing means, such as bolts 152 may be used to effect final position of the units with respect to the carriage frame.

Each of the units 150 has a substantially vertical shaft 154, the upper end of one of which at each side of the carriage is provided with a pair of sprocket gears 156 and 158 and the other one has a single sprocket 156. By reference to FIG. 15 for example, it will be seen that a sprocket chain 160 extends around the uppermost sprocket gears 156 of each pair of the units respectively disposed at opposite sides of the carriage 38. Power means such as the exemplary hydraulic motor 110 is provided with a suitable sprocket gear on its lower end and the same in connected by another sprocket chain 162 to one or the other of the lowermost sprocket gears 158 on the units 150 adjacent the side of the carriage to which the motor 110 is connected.

It will be understood as in regard to the embodiment shown in FIGS. 2 and 3 that two separate power means 110 respectively are provided adjacent opposite sides of the carriage 38, thereby minimizing complications in the driving sprocket gears and chains, especially for purposes of simultaneously rotating the shafts 154 of the pair of units adjacent one side of the carriage unidirectionally, while the shafts of the pair of units 150 adjacent the opposite side of the carriage also are rotated unidirectionally but in an opposite direction to the shafts of the units 150 on the first mentioned side of the carriage.

Fixed to the lower ends of each of the shafts 154 of the units 150 is a combination circular supporting and driving roller 164. The periphery of the roller is annularly beveled on both its upper and lower surfaces, the angle of such beveled surfaces preferably being equal with respect to the plane of the roller. The periphery of the rollers is disposed within complementary longitudinal grooves 166 formed in longitudinal track members 168 which comprise a particular shape of channel member. Such track members are suitably supported by the elongated structural members 20, such as I-beams which, as in regard to the preceding embodiment, are directly supported by the chassis stringer members 16 as clearly shown in FIG. 13. Firm connection of the track members 168 to the structural members 20 may be made by any suitable means such as continuous or spaced welds which are shown in exemplary manner in FIG. 14.

Figures 14, 15, 16, 17:
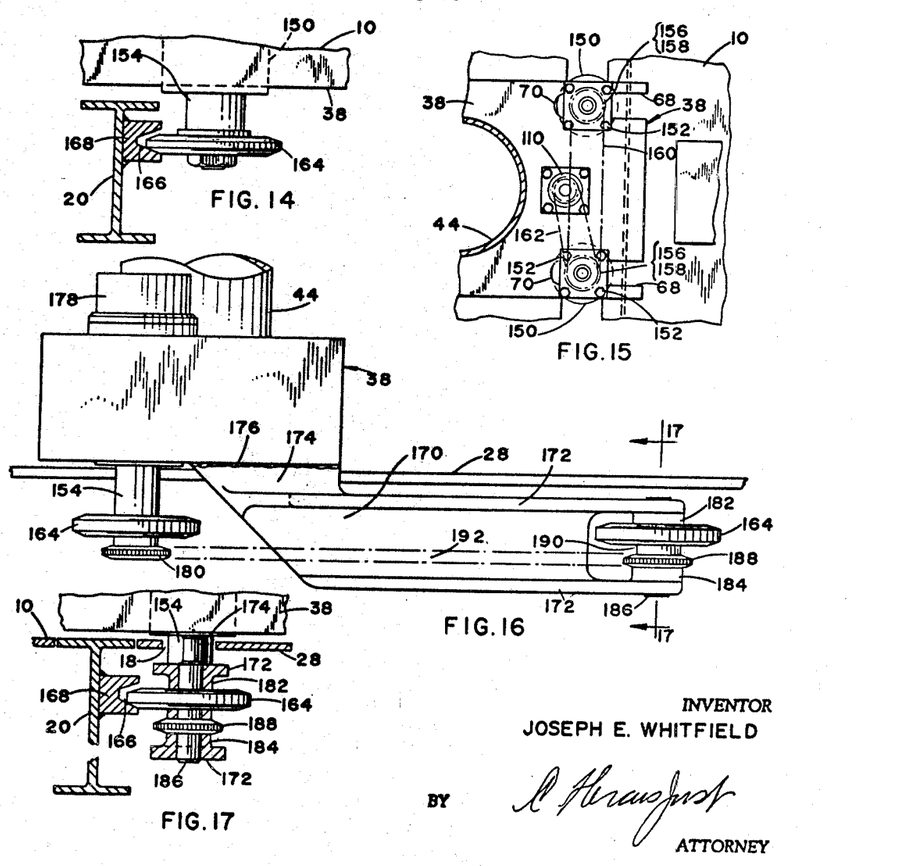
FIG. 14 is an enlarged fragmentary vertical elevation of the left-hand track and roller mechanism shown in FIG. 13, part of the structure being in vertical section.
FIG. 15 is a fragmentary sectional plan view of the embodiment illustrated in FIG. 13 as seen on the line 15—15 of said figure.
FIG. 16 is a side elevation of a still further embodiment of supporting and driving roller mechanism associated with an exemplary carriage, the rollers being similar to those in the embodiment of FIGS. 13–15 but different driving and supporting means being employed to afford substantial longitudinal spacing between the rollers at the sides of the carriage and the upper portion of the mast on the carriage being removed to decrease the height of the figure.
FIG. 17 is an enlarged vertical sectional view of part of the embodiment shown in FIG. 16 as seen on the line 17—17 of said figure.

It also will be seen from FIG. 14 that preferably there is a limited amount of clearance between the walls of the grooves 166 in the track members 168 and the peripheral surfaces of the rollers 164 which are received therein. The purpose of this is in order that a certain amount of self-seating of the carriage 38 with respect to the bed 10 of the vehicle may be achieved. Such self-seating is facilitated if the angle between the opposing faces of the groove 166 and the complementary surfaces on the periphery of the rollers 164 is selected so that, in particular, the lower surface of the grooves 166, against which the rollers 164 are disposed under most normal conditions of operation, is at an angle generally of the order of approximately between 15 and 20 degrees above the horizontal. Theoretically, it can be visualized that the arrangement, when considering all four of the rollers with respect to the track members engaged thereby, will function somewhat similarly to a ball rolling in a conclave dish or saucer and finding its own center. Obviously, such self-seating function of the carriage with respect to the track members will be of a very limited nature but nevertheless the structure is such as to permit such self-seating where either the terrain upon which the vehicle is located or the position of the load with respect to the mast and boom is such as to induce such limited amount of self-seating.

As in regard to the preceding embodiment, it also will be seen that the embodiment shown in FIGS. 13–15 and described hereinabove will permit either the upper or lower peripheral portions of the rollers 164 to engage respectively the upper or lower surfaces of the grooves 166 of track members 168, depending upon the manner in which the carriage 38 is canted with respect to the bed 10.

The embodiment of roller and track combination 164 and 168 shown in FIGS. 13–15 also offers a different advantage from the embodiment in the preceding figures in that, since the engaging surfaces of the periphery of the rollers 164 and track grooves 166 are complementary, a greater area of frictional engagement is offered between said engaging surfaces than in the embodiment of the preceding figures wherein substantially only a line contact is afforded between the rollers 62 and the track members 30 for example, at least until a limited amount of wear might occur between such grooved rollers and cylindrical track members 30 with respect to the upper and lower coengaging surfaces of the same. Further, it will be appreciated that if the angle of the peripheral surfaces of rollers 164 and the complementary surfaces of the grooves 166 in track members 168 is increased over that shown in the drawings with respect to the plane of the rollers 164 for example, even greater frictional engagement may be achieved if found necessary.

Another embodiment of roller arrangement is illustrated in the exemplary disclosure of FIGS. 16 and 17 wherein the same general shape of roller has been selected for simplicity of illustration. The principal feature afforded by the embodiment of FIGS. 16 and 17 over the various features of the preceding embodiment lies in the advantage of extending the fore and aft rollers at each side of the carriage 38 a substantially greater distance than is possible in the preceding embodiments without making the length of the carriage 38, in the direction of the longitudinal axis of the bed of the vehicle, unduly extensive. As has been described hereinabove, it is desirable that such length of the carriage 38 be of a minimum amount in order not to deprive the operator of beneficial load area. However, it is essential that an appropriate amount of longitudinal spacing occur between the rollers at one side or the other of the carriage, and preferably on both sides, in a direction parallel to the longitudinal axis of the bed of the vehicle, in order to prevent any appreciable tilting of the carriage with respect to the bed incident to a load being supported by the mast and boom, particularly when the boom is extending substantially forward or rearward with respect to the length of the bed of the vehicle. In this regard, in the embodiments shown in FIGS. 1–12 and also in FIGS. 13–15, it is contemplated that the longitudinal dimension between the axes of the shafts 56 of the first embodiment and 154 of the second embodiment be adequate to provide the desired stability of the carriage 38 with respect to the bed 10 in the manner described immediately above.

Referring to the additional embodiment shown in FIGS. 16 and 17, however, it will be seen that the longitudinal dimension of the exemplary carriage 38 shown in FIG. 16, which dimension is parallel to the longitudinal axis of the bed 10, may be minimum and yet provide desired resistance to canting of the carriage 38 about an axis transverse to the longitudinal axis of the bed 10 as when the boom is extending more or less forward or rearward with respect to the longitudinal axis of the bed. Such resistance is afforded by means of bracing arms 170, one of which preferably is provided adjacent each side of the carriage 38. In cross-section, as will be seen from FIG. 17, the arm 170 preferably is rendered adequately rigid by being somewhat in the form of a structural member such as an I-beam which has parallel upper and lower flanges 172.

One end of each of the arms 172 has a vertical, central web or rib 174 integral therewith and of appreciable length as can be seen from FIG. 16. Said rib also is of a substantial thickness to provide adequate resistance to bending within a vertical plane. The upper edge of said rib is secured, such as by a longitudinal weld 176, along each of the opposite sides of the rib, to the lower surface of the carriage 38. The rib 174 moves within the slot 18 in the bed of the vehicle 10. Said slot also is sufficiently wide to accommodate the shaft 154 of the power unit 178 which preferably is a hydraulic motor. In regard to this embodiment of the invention, it only is necessary to have a single power unit at each side of the carriage 38 and the shaft of such unit which is supported by suitable anti-friction bearings, not shown, depends below the carriage 38, through the slot 18, and supports on its lower end a rotatable supporting member such as roller 164 which, for example, may be accommodated within the grooved track member 168. However, it is to be understood that the advantages of the bracing effect afforded by the embodiment shown in FIGS. 16 and 17 may be applied to the preceding embodiment with suitable modification. Further, the lower end of the shaft 154 preferably supports a driving sprocket gear 180 immediately below the roller 164, for example.

The outer end of the arm 170 at each side of the carriage 38 supports another rotatable driving and supporting member such as roller 164. Said roller is accommodated within a yoke-like arrangement comprising bosses 182 and 184 connected respectively to the outer ends of the upper and lower flanges 172 of arms 170. Said bosses preferably support anti-friction bearings, not shown in detail, which rotatably receive a shaft 186 parallel to the shaft 154 of power unit 178. Said shaft supports between the ends thereof and also between the bosses 182 and 184, another roller 164 preferably identical to the corresponding roller on the lower end of shaft 154, and a driven sprocket gear 188, the same preferably being spaced from the roller 164 by a suitable collar 190. An appropriate sprocket chain 192 extends around the sprocket gears 180 and 188 for purposes of driving the latter by the former, said gears being of the same size in order that the driving speed of the longitudinally spaced rollers 164 may be the same for simultaneous engagement with the track member 168 for example.

From FIG. 16 in particular, it can be visualized that, in actual practice, the distance between the axes of the shafts 154 and 186 may be of the order of as much as three or four feet, if such spacing is required to afford the desired amount of bracing for the carriage 38, depending upon the loads contemplated to be supported by the mast and boom, the length of the boom, the height of the mast, and the like. The arms 170 are entirely below the bed of the vehicle as can be seen particularly from FIG. 17 as well as from FIG. 16 wherein the bed is represented by the deck plate member 28, with the exception of the relatively narrow connecting rib 174 on each arm by which it is connected to the lower surface portion of the carriage 38. Further, the arms 170 may extend either forwardly or rearwardly with respect to the bed 10 of the vehicle.

Still another embodiment of supporting and driving roller arrangement for a carriage movable longitudinally along the bed of a vehicle is afforded by the present invention. Said embodiment is illustrated in detail in FIGS. 18–20. This embodiment, like the preceding embodiment of FIGS. 16 and 17, affords substantial bracing of the carriage against canting relative to an axis extending transversely to the longitudinal axis of the bed of the vehicle, while permitting the carriage to be relatively short in the direction of the longitudinal axis of the vehicle. Such details of said additional embodiment are as follows.

Figure 18:
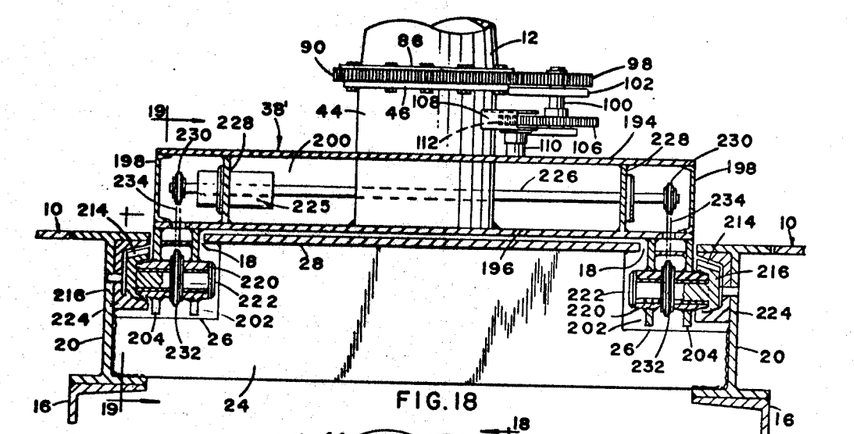
FIG. 18 is an exemplary transverse vertical section view of a vehicle bed and mast structure supported by a carriage, as generally seen on the line 18—18 of FIG. 19 and in which still another embodiment of track and supporting roller structure is shown from that employed in the embodiments of the preceding figures.

As in regard to the preceding embodiments, it is contemplated that this additional embodiment is supported with respect to the chassis of the vehicle by the use of elongated structural members 20 which are directly supported by the exemplary chassis stringer members 16 as shown in FIG. 18. In said figure, the bed of the vehicle 10 is represented by fragmentary portions of bed plates and the deck plate means 28 is spaced at its opposite edges from the innermost edges of the flanges of the I-beams 20 to provide the slots 18 shown in FIG. 18 which preferably are the same as the slots in the preceding embodiments.

Figure 19:
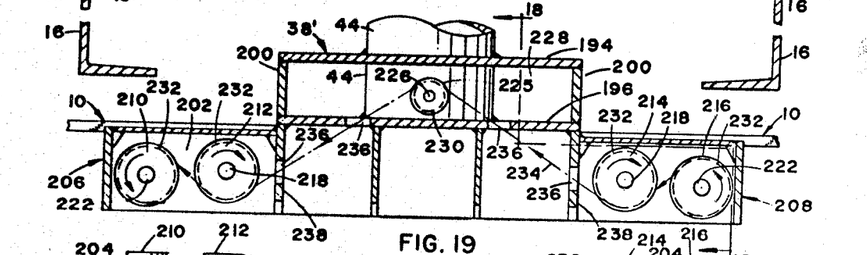
FIG. 19 is a vertical sectional view taken generally along one side of the embodiment shown in FIG. 18 as seen on the line 19—19 of said figure and illustrating diagrammatically the drive means for the supporting roller structure.

Particularly from FIG. 19, it will be seen that the carriage 38' is relatively short, it being understood that FIG. 19 is a longitudinal vertical section of the carriage in the direction of the longitudinal axis of the bed 10 of the vehicle. In this embodiment of the invention, the carriage 38 may be constructed of any suitable means such as upper and lower plates 194 and 196 which, for example, may be of steel plate of suitable thickness. An appropirate hole may be formed in the upper plate 194 to receive the central support means 44, the lower end thereof, for example, abutting the upper surface of the lower plate 196.

The plates 194 and 196 are spaced vertically by any suitable means such as parallel side plates or channels 198, and parallel forward and rearward end plates 200 as shown in FIG. 19. All of said plates may be suitably connected rigidly together such as by welding, bolts or the like. In the preferred construction of the carriage 38', it is rectangular in plan view and has a longer transverse dimension with respect to the bed 10 of the vehicle than its length which extends parallel to the longitudinal axis of the bed.

Figure 20:
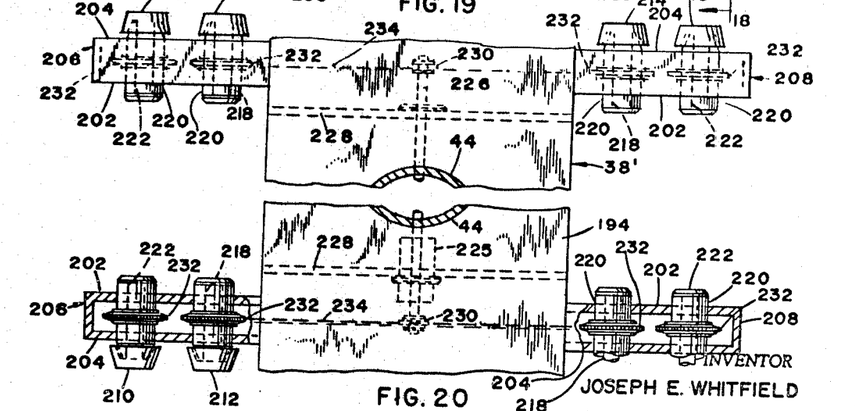
FIG. 20 is a fragmentary, transversely foreshortened plan view of the carriage shown in the embodiment of FIGS. 18 and 19 and in which part of the structure is horizontally sectioned so as better to illustrate details thereof.

In the embodiment shown in FIGS. 18–20, it is preferred that the slots 18 may be slightly wider than the corresponding slots in the preceding embodiment for purposes of receiving a pair of parallel depending, transversely spaced frame plates 202 and 204 which respectively are received in the slots 18 as readily shown in FIG. 18. The upper edges of said frame plates are suitably fixed permanently to the lower surface of carriage 38' such as by welding the same to the lower carriage plate 196. From FIG. 19, it will be seen that the frame plates 202 and 204 preferably are substantially longer than the length of the carriage 198 in the direction of the longitudinal axis of the bed to provide fore and aft extensions 206 and 208 for the depending frame plates 202 and 204 which may be referred to as the bracing structure which resists tilting or canting of the carriage 38' relative to the bed 10 about an axis transverse to the longitudinal axis of said bed. Such fore and aft extensions are identified particularly in FIGS. 19 and 20.

The carriage 38' is supported and also driven longitudinally of the bed 10 of the vehicle by a plurality of pairs of rollers 210 and 212 adjacent one end of each of the pairs of side plates 202 and 204 and a plurality of additional pairs of rollers 214 and 216 respectively adjacent the opposite ends of said pairs of side plates 202 and 204. Preferably, but without restriction thereto, the relative fore and aft pairs of rollers 210, 212 and 214, 216 are mounted in the fore and aft extensions 206 and 204 respectively at opposite sides of the carriage 38', as can be best seen from FIGS. 19 and 20.

Particularly from FIG. 19, it will be seen, for example, that the rollers 212 and 214 at opposite sides of the carriage and respectively adjacent opposite ends thereof are mounted for rotation upon shafts 218 which extend between the pairs of depending frame plates 202 and 204 within bearing sleeves 220 which extend between and are connected to said pairs of depending frame plates. It will be understood that the bearing sleeves preferably support anti-friction bearings, not shown in detail, within which the shafts 218 rotate. The rollers 210 and 216 respectively at opposite sides of the carriage and respectively adjacent the opposite ends thereof are supported by shafts 222 which also are supported within additional bearing sleeves 220, preferably by anti-friction bearings not specifically illustrated, said additional sleeves 220 also extending between and fixed to the depending frame plates 202 and 204.

By reference to FIG. 19, it will be seen that the axes of the shafts 218 which support the rollers 212 and 214 are disposed at a higher horizontal level than the shafts 222 which support the rollers 210 and 216 respectively adjacent opposite ends of the carriage and particularly the fore and aft extensions 206 and 208. This difference in elevation also is illustrated in FIG. 18. Under normal conditions, particularly when the carriage 38' is not canted relative to the bed 10 as, for example, when the vehicle is disposed upon relatively level terrain, the lowermost rollers 210 and 216 will be in engagement with the lower flanges of channel-type track members 224 which respectively are fixedly connected to the inner surfaces of the vertical webs of the elongated structural members 20 which are affixed to the bed 10 to support the same upon the chassis stringer members 16. Such affixation of the track members 224 may be by any suitable means such as welds, either of a continuous or spaced nature, as desired. Under such circumstances, the rollers 212 and 214 which are disposed at a higher elevation than the rollers 210 and 216 will be adjacent but preferably spaced from the lower surfaces of the upper flanges of the channel type track members 224 as can be readily seen from FIG. 18.

The purpose of the differences in elevation between the uppermost rollers 212 and 214 and the lowermost rollers 210 and 216 is so that rollers of substantial diameter may be utilized without making it necessary to utilize depending frame plates 202 and 204 of appreciable vertical dimension and thereby permit the use of elongated structural members 20 of readily available dimensions such as of the order of 8 or 10 inches depth. By such arrangement, it will be seen that the cross-beams 24, as seen in FIG. 18, which are for purposes of supporting intermediate deck plate means 28, may be formed with substantially rectangular recesses 26 to accommodate the depending frame plates 202 and 204. The ends of the cross-beams 24, as in regard to the preceding embodiments, may be secured at their ends to the inner surfaces of the vertical webs of structural members 20 by any suitable means such as weldments.

In the preferred construction of the supporting means for the pairs of rollers 210, 212 and 214, 216, the differences in vertical position of the shafts respectively supporting the same is such that only one roller of each pair is in engagement with the flanges of the track members at any one time. Hence, when the uppermost rollers 212 and 214 are in engagement at one side or the other with the upper flanges of the track members 224, the lowermost rollers will be out of engagement with the lowermost flanges of the track members, and vice versa. By such arrangement, and particularly in view of the fact that the rollers and complementary surfaces of the track members 224 are beveled, as generally illustrated in FIGS. 18 and 20, a suitable amount of self-seating of the carriage with respect to the track means is possible as in regard to the preceding embodiments wherein such self-seating is described in greater detail.

In accordance with the preferred construction of the present invention, all of the supporting and driving rollers of the embodiment shown in FIGS. 18–20 are driven positively by means which may be of a relatively simple construction. Preferably, a single power source is utilized, the same being in the form of a hydraulic motor 225, the shaft 226 of which is preferably elongated and extends transversely through the carriage 38' somewhat in the manner as illustrated in FIG. 18. To suitably support the shaft and motor, the interior of the carriage 38' may be provided with suitable elongated strut plates 228, the motor 225 preferably being secured to one of the same as illustrated somewhat diagrammatically in FIG. 18.

Appropriate bearings provided in the plates 228 support opposite ends of the shaft 226, upon which driving sprocket gears 230 are fixed. Fixed to each of the shafts which support the various rollers 210, 212, 214 and 216, intermediately of the ends thereof and between the depending frame plates 202 and 204 are driven sprocket gears 232. As can best be seen from FIGS. 18 and 20, said sprocket gears, being between the vertical plates 202 and 204, will be amply protected from contact by dust and other extraneous matter which might fall through the slots 18 incident to operation of the vehicle for its intended purposes.

The sprocket gears 232 on all of the various shafts at each side of the carriage 38' are driven preferably by a single sprocket chain 234 at each side of the carriage, said sprocket chain extending around all of the driven sprocket gears 232 and also around the driving sprocket gears 230 in the manner illustrated diagrammatically by broken lines and arrows in FIG. 19. Appropriate openings 236 formed in the lower plate 196 of the carriage and transverse bracing plates 238 between the vertical frame plates 202 and 204, whereby the inherent strength of the carriage and particularly the fore and aft extensions 206 and 208 are not impaired in any way.

When the sprocket chains 234 are moving in the direction illustrated in FIG. 19, it will be seen that the uppermost surfaces of the higher rollers and the lowermost surfaces of the lower rollers, at both ends of the carriage, are all moving in the same direction at any single time, i.e., toward the right as viewed in FIG. 19. The motor 225 is of the reversible type and upon being reversed, all of the rollers will be driven in the opposite direction to that presently indicated by the arrows thereon in FIG. 19. In view of such arrangement, therefore, it will be seen that the embodiment of the invention shown in FIGS. 18–20 affords positive driving for all of the supporting rollers, unidirectionally, regardless of whether the carriage 38' is canted transversely about the longitudinal axis of the bed or longitudinally about an axis transverse to the longitudinal axis of the bed, or therebetween.

As in regard to the preceding embodiments, a limited amount of clearance preferably is provided between the various uppermost and lowermost driving and supporting rollers and the upper and lower flanges of the channel-type track members 224. Such arrangement not only permits the aforementioned self-seating of the carriage with respect to the track members but particularly the beveled nature of said rollers and complementary engaging surfaces on the track members affords highly effective frictional engagement between the driving rollers and the track surfaces contacted by said rollers. Further, by means of the simplified driving mechanism afforded by the embodiment of FIGS. 18–20, an even shorter and narrower carriage 38' may be employed than in certain of the preceding embodiments.

From the foregoing, it will be seen that, in the preferred construction of the various embodiments, all of the supporting rollers for the carriage are driven positively. Such driving also is effected regardless of whether upper or lower portions of the driving wheels are engaging respectively upper or lower portions of the track means. Self-seating or locating of the carriage with repect to the track means is effected due primarily to the beveled or somewhat conical nature of the supporting and driving rollers of substantially all of the embodiments, this feature being particularly advantageous in the event a heavily loaded vehicle is parked upon uneven terrain tends to somewhat skew the bed of the vehicle for smaller or greater increments of time. Such self-seating of the carriage tends to insure that rollers respectively adjacent all of the corners of the carriage or roller-supporting means thereon will engage the track members. Further, the supporting rollers are all below the load-bearing surface of the bed and the contacting portions of said rollers are always spaced transversely and longitudinally of said bed at maximum spacing of said rollers, thereby achieving maximum efficiency in maintaining the mast upon the carriage at minimum deflection from an axis theoretically perpendicular to the bed of the vehicle.

In the foregoing description and the appended claims, the terms "sprocket gears" and "sprocket chains" are intended to denote generically any type of circular driving and driven rotatable means around which a flexible, endless member extends to drivingly connect all of said rotatable means, the same having interfitting complementary means thereon serving to prevent slippage between said circular means and flexible member so as to insure uniform surface speeds on all of the rollers on the various embodiments of carriages described and illustrated herein.

While the invention has been described and illustrated in its several preferred embodiments, it should be understood that the invention is not to be limited to the precise details herein illustrated and described since the the same may be carried out in other ways falling within the scope of the invention as described in the foregoing specification.

I claim:

1. A load handling apparatus comprising a bed having a pair of slots spaced transversely apart and extending longitudinally of said bed from the rear end toward the front end thereof, a pair of structural members extending longitudinally of said bed adjacent said slots, the upper surfaces of said structural members being no higher than the upper surface of said bed, a pair of elongated parallel track members having upper and lower surface portions extending longitudinally of said bed parallel to and adjacent said slots below the upper surface of said bed and secured to said structural members for support thereby, a carriage substantially parallel to said bed and movable longitudinally therealong above the upper surface thereof, said carriage extending transversely at least partially between said slots, a load-supporting assembly mounted on said carriage and comprising a vertically extending mast structure and a rotatable laterally exterally extending boom structure mounted on said mast structure adjacent the top thereof, a load supporting means mounted on said boom in a manner during load handling operations due to an overbalancing load tending to tilt said carriage from the normal plane thereof in which it is substantially parallel to said bed, roller means having concaved grooved peripheries mounted entirely below the upper surface of said bed and engaging complementary surfaces on said track means for support thereby, said rollers constituting the sole traction means for said carriage, means extending vertically downward from spaced locations on said carriage through said slots and operably connected to said roller means to support the same substantially within a plane parallel to and below said bed, and power means operable selectively in reversible directions and connected to all of said roller means to drive the same in directions to move all portions of said grooves in the peripheries of said roller means in engagement with said track members unidirectionally relative thereto regardless of whether said portions of said roller means are in engagement with said upper or lower surface portions of said track members.

2. The vehicle bed and carriage structure according to claim 1 in which said means on said carriage which support said roller means comprise shafts extending through said slots and the lower ends thereof being connected to said roller means and said shafts being movable along said slots with said carriage.

3. The vehicle bed and carriage structure according to claim 1 in which a pair of said roller means are mounted respectively at longitudinally spaced locations along each side of said carriage and said sides of said carriage being parallel to said slots.

4. The vehicle bed and carriage structure according to claim 1 in which said track members are connected respectively to inwardly facing surfaces of said structural members for direct support thereby.

5. The vehicle bed and carriage structure according to claim 1 in which the upper surfaces of said structural members are flush with the upper surface of said vehicle bed.

6. The vehicle bed and mast structure according to claim 5 further including a plurality of transverse support members extending between said structural members at spaced locations therealong and deck means supported by said transverse support members between said slots in said bed, said deck means being flush with the upper surface of said portions of said truck bed extending laterally outward from said slots.

7. The vehicle bed and carriage structure according to claim 1 in which said supporting means for said roller means comprise substantially vertical shafts rotatably supported at spaced locations upon said carriage and extending through said slots, said roller means comprising circular rollers fixed transversely to said shafts and having peripheral grooved configurations complementary to said track members in a manner to prevent any substantial relative vertical movement between said rollers and track members and also provide frictional driving engagement therebetween.

8. The vehicle bed and carriage structure according to claim 7 in which the shafts at one side of said carriage are rotated in the same direction by said power means and the shafts at the opposite side of said carriage are also rotated in the same direction by said power means but in the opposite direction to the shafts on said one side.

9. The vehicle bed and carriage structure according to claim 8 in which said shafts are each supported by antifriction bearings supported as an assembled unit with said shaft and such units are connected to frame means on said carriage, the units on at least one side of said carriage being adjustably positioned laterally to permit accommodation of the carriage and rollers to beds having different transverse distances between said track members thereof.

10. The vehicle bed and carriage structure according to claim 9 in which said units have flange means engageable with and connectable in fixed position relative to said carriage frame.

11. The vehicle bed and carriage structure according to claim 7 in which said roller means are peripherally grooved rollers and at least that portion of the surface of said track members engaged thereby being convexly curved in cross-section and sufficiently complementary to the grooved surfaces of said rollers which receive said track portion for support thereby to provide frictional driving engagement therewith.

12. The vehicle bed and carriage structure according to claim 11 in which said track members are elongated cylindrical members fixed to the inner surfaces of structural members fixed to said bed below the load-receiving surface thereof.

13. The vehicle bed and carriage structure according to claim 11 in which the flanges at opposite sides of said grooved peripheries of said rollers have limited clearance between the surfaces of said track members engaged thereby to permit limited self-seating of all of said rollers relative to said track members.

14. The vehicle bed and carriage structure according to claim 12 in which said structural members comprise I-beams, the upper flanges thereof being flush with the upper surface of said bed and said elongated cylindrical track members being fixed by weldments to the inner surfaces of the webs of said I-beams.

15. The vehicle bed and carriage structure according to claim 11 in which said carriage extends transversely across said bed between the slots therein and said shafts supported thereby being positioned adjacent the opposite sides of said carriage and spaced longitudinally therealong, and drive means on at least one of said shafts at each side of said carriage interconnected to said power means to effect driving of said shafts to propel said carriage longitudinally along said bed in a selected direction of movement, said power means being carried by said carriage.

16. The vehicle bed and carriage structure according to claim 15 in which all of said shafts have drive means comprising sprocket gears and said power means being connected thereto by sprocket chain means extending around said sprocket gears and a driving sprocket gear means on said power means.

17. The vehicle bed and carriage structure according to claim 1 in which said carriage is provided with extensions adjacent opposite sides projecting longitudinally from at least one end of said carriage, one of said rollers at each side of said carriage being supported adjacent the outer ends of said extensions to provide substantial longitudinal spacing between the rollers adjacent each side of said carriage, thereby to minimize the length of said carriage in a direction longitudinally of said bed while providing substantial resistance to tilting tendencies imposed by a load upon said carriage about an axis transverse to said bed.

18. The vehicle bed and carriage structure according to claim 17 in which said extensions are below the upper surface of said bed.

19. The vehicle bed and carriage structure according to claim 18 further including drive means extending between the longitudinally spaced rollers at each side of said carriage below the upper surface of said bed.

References Cited

UNITED STATES PATENTS

| | | | |
|---|---|---|---|
| 891,882 | 6/1908 | Valentine | 105—30 |
| 2,156,424 | 5/1939 | Barnard. | |
| 2,709,968 | 6/1955 | Cox | 105—30 |
| 2,857,062 | 10/1958 | Anderson. | |
| 2,913,997 | 11/1959 | Wolf | 105—30 |
| 3,194,178 | 7/1965 | Weston | 105—30 XR |
| 3,301,416 | 1/1967 | Bopp. | |

FOREIGN PATENTS 1,231,726  4/1960  France.

GERALD M. FORLENZA, Primary Examiner

R. B. JOHNSON, Assistant Examiner

U.S. Cl. X.R.

212—55